US006996342B2

(12) United States Patent
Park et al.

(10) Patent No.: US 6,996,342 B2
(45) Date of Patent: Feb. 7, 2006

(54) CONTROL SYSTEM FOR AN AGILE OPTICAL NETWORK

(75) Inventors: David W. Park, Kanata (CA); Lisa M. Gaen, Ottawa (CA); Gerard L. Swinkels, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 705 days.

(21) Appl. No.: 09/974,907

(22) Filed: Oct. 12, 2001

(65) Prior Publication Data

US 2003/0011844 A1    Jan. 16, 2003

Related U.S. Application Data

(60) Provisional application No. 60/306,437, filed on Jul. 16, 2001.

(51) Int. Cl.
*H04J 14/00* (2006.01)
*H04B 10/08* (2006.01)
*H04B 17/00* (2006.01)
*H04B 10/02* (2006.01)
*H04B 10/12* (2006.01)

(52) U.S. Cl. .......................... 398/48; 398/25; 398/175
(58) Field of Classification Search ................. 398/79, 398/25, 26, 27, 28, 29, 175, 48–50
See application file for complete search history.

(56) References Cited

U.S. PATENT DOCUMENTS

| 5,914,798 A | 6/1999 | Liu ............................ 359/161 |
| 6,215,768 B1 | 4/2001 | Kim .......................... 370/216 |
| 2002/0191247 A1 * | 12/2002 | Lu et al. ..................... 359/124 |

FOREIGN PATENT DOCUMENTS

| EP | 0 969 621 A2 | 1/2000 |
| EP | 1 278 324 A2 | 1/2003 |
| EP | 1 303 160 A2 | 4/2003 |

OTHER PUBLICATIONS

Shen G. et al.—"Efficient Heuristic Algorithms for Lightpath Routing and Wavelength Assignment in WDM Networks Under Dynamically Varying Loads"—Computer Communications, Elsevier Science, publishers BV Amsterdam, NL, vol. 24, No 3-4 Feb. 15, 2001.

Huan-Wen Tzeng et al.-"Traffic Grooming in WDM Networks Using Genetic Algorithms"—Systems, Man and Cybernetics, 1999. IEEE SMC '99 Conference Proceedings. 1999 IEEE International Conference on Tokyo, Japan, Oct. 12-15, 1999.

\* cited by examiner

*Primary Examiner*—M. R. Sedighian
*Assistant Examiner*—Nathan Curs
(74) *Attorney, Agent, or Firm*—Max R. Wood; Ogilvy Renault, LLP (57) ABSTRACT

A control system for an agile optical network uses constraint-based rules to minimize route validation computations required when the network is reconfigured. A hierarchical control structure facilitates admission control and insulates admission control from interaction with the physical layer of the network.

26 Claims, 4 Drawing Sheets

CONTROL SYSTEM FOR AN AGILE OPTICAL NETWORK

CROSS-REFERENCE TO RELATED APPLICATIONS

This application is based on U.S. Provisional Application No. 60/306,437, filed Jul. 16, 2001.

MICROFICHE APPENDIX

Not Applicable.

TECHNICAL FIELD

The present invention relates in general to routing in optical networks, and, in particular, to a method and apparatus for permitting efficient dynamic routing in wavelength division multiplexing (WDM) networks using rules abstracted from physical propagation constraints in the WDM network.

BACKGROUND OF THE INVENTION

Many wavelength division multiplexing (WDM) optical networks now leverage signal propagation techniques that permit a distance between regeneration of optical signals to be extended beyond a single optical fiber link in a legacy optical network. Consequently electrical switches that perform optical-electrical-optical (OEO) conversions to regenerate optical signals, and route optical signals on respective optical fiber links, become redundant for at least certain channels. Given the space and power consumption of equipment required to perform OEO conversions, the complexity and transmission delays that OEO conversion incurs, and the high capacity of optical fiber, it is recognized that overlaying electrical switches with all-optical switches permits more efficient use of network resources. The all-optical switches perform wavelength selective switching, permitting the independent routing of each wavelength in a WDM optical fiber. Wavelengths can be "added" or "dropped" by the all-optical switches. The dropped wavelengths can be routed to a subtending electrical switch. The electrical switch performs OE conversion, and switches the converted signal received on a dropped wavelength to at least one output port. The output port may support a connection to a terminal or other network equipment, or it may be an optical transmission port adapted to perform EO conversion, and thus be connected to an optical fiber link. If the optical fiber link is connected to the all-optical switch, the subtending electrical switch can be used to regenerate the dropped wavelength using the OEO conversion capabilities of the electrical switch.

There are a number of challenges raised by network routing in this kind of WDM optical network. U.S. Pat. No. 6,215,763 B1, entitled MULTI-PHASE PROCESS FOR DISTRIBUTED PRE-COMPUTATION OF NETWORK SIGNAL PATHS, which issued to Bharat et al. on Apr. 10, 2001, teaches a two phase method for assigning link capacity to a requested data transport service. A first phase assigns capacity that can be made available without conflicting with existing capacity assignments; and a second phase deals with contention resolution. Although meritorious, this invention bases capacity assignment only on wavelength availability and failure isolation.

In WDM optical networks that perform all-optical wavelength switching, link capacity allocation is preferably constrained by minimizing the use of drop paths for regeneration so that communications channels can be maintained for as long as possible in an all-optical domain. Consequently, efficient capacity allocation for one link is dependent on capacity allocation on adjacent links. Efficient allocation of capacity depends on two important factors; capacity available on all wavelengths that may be conveyed through a given link, and the viability of using any one or more of the wavelengths to establish a channel through the network. The viability depends on all of the transmission equipment in each link of a wavelength in the communications channel. Consequently, link allocation should be performed, contrary to the method of Bharat, on a wavelength basis, especially to improve the efficiency of routing in WDM optical networks that perform wavelength selective routing.

No method for automatic reconfiguration of a WDM optical network is known that specifically takes into consideration the viability of a communications channel. Instead, admission control and network reconfiguration are performed separately. This leads to inefficient routing and network resource utilization. By taking into account link viability, the optical spans of a wavelength can be maximized, resulting in fewer regenerations and cheaper data transport.

In modern networks that carry mixed traffic, there is frequent demand for network reconfiguration to accommodate fluctuating traffic loads. An agile network that is adopted to autonomously reconfigure is therefore desirable. To be most effective, the agile network must be adapted to reconfigure at the wavelength level in order to provide maximum flexibility.

There therefore exists a need for a method for automatic reconfiguration of a WDM optical network that performs wavelength selective routing, to permit agile reconfiguration in dynamic response to requests for service.

SUMMARY OF THE INVENTION

It is therefore an object of the invention to provide a method and system for controlling and reconfiguring an agile optical network.

It is a further object of the invention to provide a method and system for controlling an agile optical network using constraint-based rules that minimizes the computational effort required for computing new routes through the agile network.

The invention therefore provides a system for adaptively controlling communications channels in a wavelength division multiplexing (WDM) optical network that performs wavelength selective switching. The system comprises a wavelength and route manager (WRM) that determines a communications channel to be set up to satisfy a request for service between two network elements (A and B) using a channel selection algorithm that references at least one rule abstracted from a physical constraint on signal transmission through the optical network to select at least one wavelength for providing the communications channel between A and B. The system also uses a constraint-based route validator for verifying that the at least one wavelength is viable, and means for effecting the setup of the at least one wavelength between A and B to provide the communications channel if the constraint-based route validation determines that the route is valid.

The system further comprises a service manager adapted to receive the requests for service, and exchange admission control signaling messages with edge network elements.

The system also includes a capacity manager adapted to receive a request for connection capacity between specified network elements; determine if there is available capacity to satisfy the request on an existing communications channel between the specified network elements; if there is available capacity on an existing communications channel, allocate the capacity to the service request, and return a message to the service manager identifying the existing communications channel; and if a communications channel with available capacity does not exist, to send a message to the WRM requesting that a channel be set up to satisfy the service request.

The channel selection algorithm comprises: a route selector adapted to evaluate routes between A and B in accordance with at least one criterion, and to use the evaluation values to select a route; and a wavelength selector adapted to select the at least one wavelength for the communications channel on the selected route.

The route selector further comprises a route evaluation algorithm adapted to determine a value associated with at least one of a number of optical links in the route; a sum of lengths of the optical links in the route; and, a sum of costs associated with each optical link in the route, for each route evaluated; and to use the determined value of each route to select a route with a preferred value.

The wavelength selector is adapted to select the at least one wavelength subject to constraints that include each of the at least one wavelengths is not indicated to be currently used on any section in the route; and if regeneration is required, a regenerator is available to regenerate the at least one wavelength in response to regeneration opportunity information. The wavelength selector is further adapted to access a data store in order to retrieve at least one of wavelength utilization information, and regeneration opportunity information. The wavelength selector is further adapted to obtain a distance traversed between A and B over the selected route, and to compare the distance with a predefined regeneration threshold in order to estimate a number (R) of regenerations required for a channel on the route, R being used to select R available regeneration points on the route. The wavelength selector is also adapted to generate sets of R regeneration points; evaluate the respective sets of R regeneration points in accordance with at least one criteria; and select a set of regeneration points that achieves a highest evaluation among the sets evaluated.

The constraint-based routing validator receives an identifier of the at least one wavelength selected by the WRM, and is adapted to parse the at least one wavelength into respective sections; obtain parameters of transmission equipment in each of the sections; and determine if signal transmission through the respective sections is viable. The sections are defined by a route selected by the WRM.

The constraint-based route validator is further adapted to interface with a photonic control plane adapted to: store values of stable properties of transmission equipment and sections in the network; and request transmission equipment status information directly from the transmission equipment. The constraint-based route validator further determines equipment availability to ensure that the at least one wavelength is available, and that the transmission equipment in the route is operating within established parameters; and, evaluates signal transmission viability across each of the at least one wavelength.

The evaluation of signal transmission viability generates parameter values for transmission equipment that are used to provide coarse-grain settings for the transmission equipment, and the constraint-based routing validator is further adapted to send respective messages to the transmission equipment directing the transmission equipment to set transmission parameters for the channel. The evaluation may involve sending a low-power test signal through the channel. Alternatively, the evaluation may involve generating a mathematical simulation of a signal transmitted through the channel, taking into account the transmission equipment in each of the sections that the channel traverses. The constraint-based routing validator is also adapted to return a message to the WRM indicating that the channel is viable.

The invention further provides a method for adaptive wavelength rerouting in a wavelength division multiplexed WDM optical network that performs wavelength selective switching, in response to a request for transmission capacity between two network elements (A and B), comprising steps of: generating a plausible communications channel using at least one rule abstracted from physical constraints on optical signal propagation through the optical network; and verifying properties of transmission components for supporting the plausible communications channel to ensure a viability of the plausible communications channel.

The step of generating a plausible communications channel comprises steps of: selecting a route from a predefined set of routes between A and B; and selecting at least one wavelength that is unused by sections in the selected route according to wavelength utilization information.

The step of selecting a route comprises a step of evaluating each of the routes in the predefined set using at least one predefined criterion, and selecting the route that achieves a highest evaluation.

The step of evaluating each of the routes further comprises steps of: determining a value for each route at least one of a number of sections in the route, a sum of amplifiers in links in the route, a sum of lengths of the sections in the route, and, a sum of cost values associated with each section in the route; and comparing the determined values of the routes to select a route that receives an optimal value.

The step of generating further comprises a step of accounting for at least one of the following considerations: reliability of the route; existence of protection fiber along the route; and a cost of leasing the optical fiber links in the route. The step of selecting the at least one wavelength further comprises steps of: estimating a number (R) of regeneration points required for the channel; accessing regeneration opportunity information, to derive a set of regeneration points each of which currently having capacity to regenerate the channel on the selected route; and selecting from among the set of regeneration points a set of R regeneration points that are sufficiently spread out so that distances between successive regeneration points in the route are less than a predefined wavelength span. The step of selecting from among the set further comprises steps of: generating a plurality of sets of R regeneration points; evaluating each of the plurality of sets of R regeneration points according to a predetermined criterion; and selecting the R regeneration points that achieved a highest evaluation among the sets of R regeneration points evaluated.

The step of selecting the at least one wavelength further comprises a step of selecting a respective wavelength from amid a set of wavelengths available each link between successive pairs of: A, B, and members of the selected set of R regeneration points. The step of verifying the plausible communications channel, which comprises at least one wavelength, comprises steps of, for each of the at least one wavelength: parsing the wavelength into links over which it is conveyed; retrieving parameters of transmission equipment in each of the links that the wavelength is parsed into; and determining if the transmission over the wavelength is viable.

The step of retrieving parameters comprises any one or more of: looking up a data repository containing fixed data regarding transmission equipment; looking up a polled data registry to inspect a most recent entry of a polled property of the transmission equipment; and directly accessing the transmission equipment to request a status update.

The step of determining comprises steps of: ensuring that the at least one wavelength is not currently used on a link over which it is supposed to span; ensuring that the links in the wavelengths are operating within established parameters; and evaluating the signal transmission viability across each of the at least one wavelength.

The step of evaluating further comprises steps of: generating parameter values for transmission equipment on respective links to serve as coarse grain settings of the respective transmission equipment; and sending the parameter values to respective transmission equipment.

The method further comprises a step of effecting the reconfiguration of the optical transmission components to establish the communications channel.

The invention further provides a system for adaptively controlling communications channels in an agile optical network, the system comprising a wavelength and route manager (WRM) that determines a channel to be setup to satisfy a request for service between two network elements (A and B), using a route selection algorithm using at least one generic rule to evaluate a given set of routes between A and B, in order to identify a route; a route-based wavelength selector adapted to select at least one available wavelength subject to a constraint that the at least one wavelength traces the selected route; and a constraint-based route validator that: verifies a viability of the at least one wavelength; and effects the set up of the communications channel between A and B, if the viability is verified.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The present invention relates to dynamic, efficient channel control in WDM optical networks that perform wavelength selective switching. In accordance with a preferred embodiment of the invention, data transport service requests are satisfied by layers of processes with respective functionalities that collectively allocate a wavelength (or a concatenation of wavelengths) for satisfying the data transport service request, if the request is determined to be serviceable. The invention therefore enables an agile optical network that autonomously reconfigures in response to fluctuating traffic loads.

Figure 1:
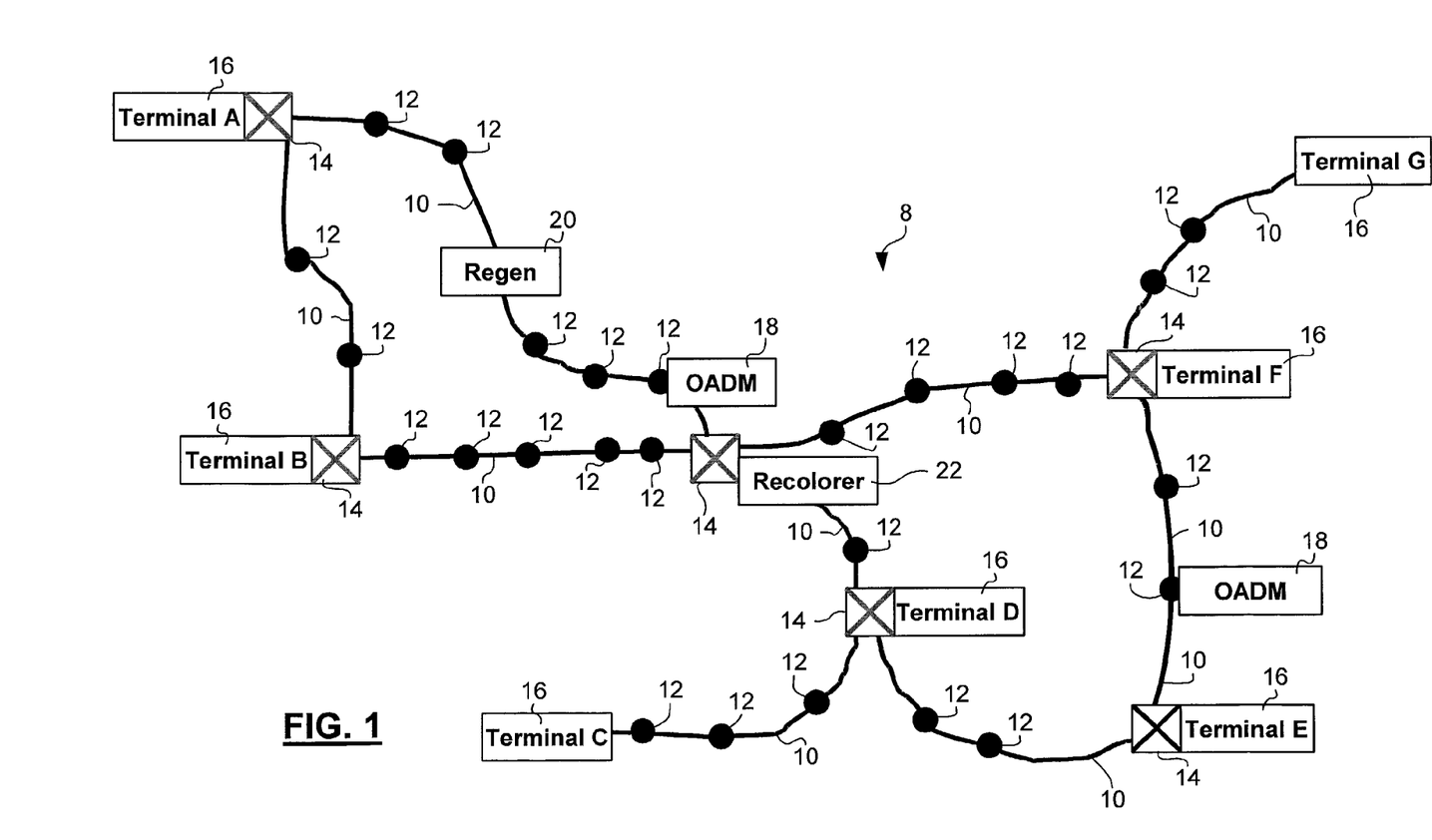
FIG. 1 is a schematic diagram illustrating principal elements of an exemplary WDM optical network that performs selective wavelength routing.

FIG. 1 illustrates an exemplary configuration for a WDM network that can be operated as an agile optical network using the methods and apparatus in accordance with the invention. Links 10 in optical networks may vary considerably with respect to the distances they span and the number of amplification sites 12 they include. There may be other differences as well, including differences in amplification site topologies, fiber types, number of wavelengths, etc. There are also differences in the structures of all-optical cross-connects 14, which absorb a proportion of signal power and introduce signal degradation and noise in amounts dependent on their respective architectures. Links 10 are terminated at opposite ends by one of: a terminal 16 or a regenerator 20, and may be terminated at sites containing\, an all-optical cross-connect 14 or an optical add/drop multiplexer (OADM) 18.

An OADM 18 may include an all-optical cross-connect with a set of add and drop ports connected to other network elements, and may perform conversion, or adaptation of data conveyed to other networks. OADMs 18, like all-optical cross-connects 14, may overlay an electrical cross-connect adapted to regenerate signals conveyed therethrough, and so the OADM 18 or the all-optical cross-connect 14 may be used to route one or more channels through an electrical cross-connect, for example, to regenerate the signal, if the OADM 18 or the all-optical cross-connect 14 has an available drop port and an add port connected to the legacy cross-connect with which it is associated. A regenerator 20 is an OEO conversion device that does not perform cross-connect functions. Terminals are devices adapted to perform OE conversion, signal processing, and EO conversion, so they can perform electrical cross connection and traffic grooming. Terminals are therefore also adapted to serve as regenerators and recolorers. A recoloring device 22 is an all-optical device that changes the color, or wavelength of a received channel, without affecting the data content of the channel.

Figure 2:
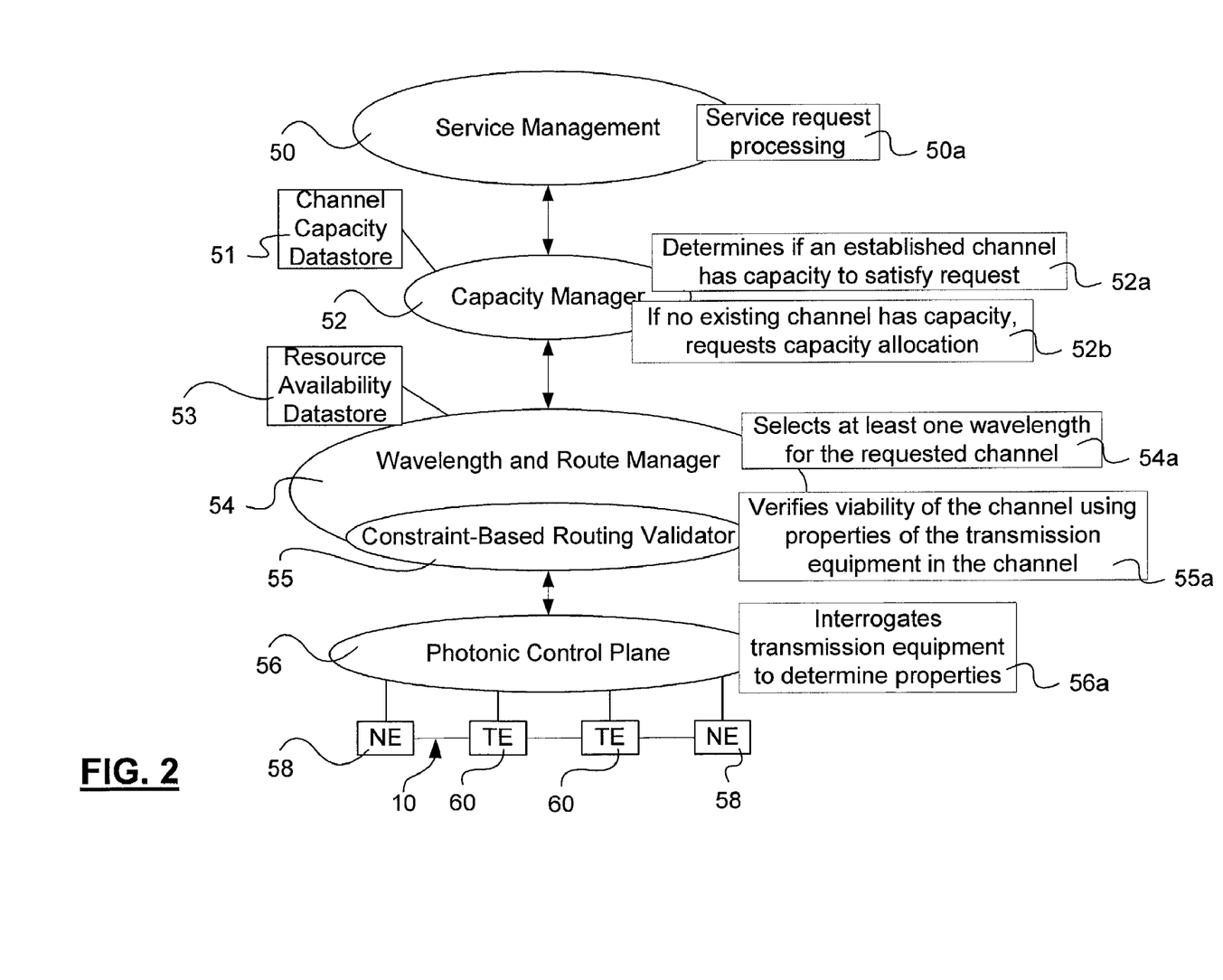
FIG. 2 is a block diagram illustrating principal functional elements in accordance with the invention for performing dynamic reconfiguration of communications channels, and principal operations performed by the respective functional elements.

FIG. 2 illustrates principal modules (50, 52, 54, 55, 56) involved in controlling an agile optical network in accordance with the invention. The modules are computer functions that may be centralized or distributed among any number of processors. The functions may be performed by on-board processors that monitor transmission equipment, or processors that are independent of the transmission equipment. The modules are arranged according to a hierarchy in which the upper modules are furthest removed from the physical layer of the network, and the lower modules are more intimately associated with the physical layer.

A service management module 50 receives requests for data transport services, as shown at 50a. As is known in the art, numerous other functions are performed by this module, including admission control signaling with edge network elements. The service management module 50 is adapted to communicate with a capacity manager module 52. The capacity manager module 52 is chiefly adapted to receive requests for capacity, access a channel capacity data store 51 to determine if capacity exists on one or more established communications channel(s) 52a to satisfy the data transport service request, and formulates a reply to the capacity request. If the capacity is not available on an established communications channel, the capacity manager module 52 issues a capacity request 52b to a wavelength and route manager (WRM) module 54.

The WRM module 54 is adapted to select at least one wavelength to provide a communications channel between the requested network elements, as shown at 54a. Resource availability data (obtained from a resource availability data store 53) and rules abstracted from signal propagation constraints are used to ensure that the selected wavelength(s) is/are likely to be viable. After the at least one wavelength is selected, the communications channel is verified, as shown at 55a, by a constraint-based routing validator (C-BRV) module 55 to ensure that the resources required for the communications channel are available; and that the selected wavelength(s) forms a viable signal path.

The verification of viability of a communications channel over selected wavelengths requires direct access to status information that is retrieved from network elements 58, and transmission equipment 60 in a route selected for the communications channel. A photonic control plane 56 is adapted to store properties of transmission equipment, (such as fiber type of optical fiber links, number and type of amplifiers in a link, total and per wavelength signal power, optical signal to noise ratio, absorption through an all-optical cross-connect, dispersion, etc), and, by means of polling, and/or periodic reporting, the photonic control plane 56 also reports variable properties of network elements 58 and transmission equipment 60. The photonic control plane 56 is further adapted to interface with controllers of transmission equipment to obtain current status information, as shown at 56a.

Illustrated in FIG. 2 is a small subset of transmission equipment (TE) 60 in single link 10 terminated by two network elements 58 in a WDM optical network. Since transmission equipment 60 is continually autodetecting wavelength utilization and monitoring numerous other status parameters, the most accurate information regarding resource utilization and channel viability can only be obtained at the equipment control level. In accordance with the invention, this information is accessed in order to reliably determine the resource availability for, and viability of, communications channels.

As is known in the art, viable signal transmission depends on the ability to control several factors (e.g. dispersion, noise, signal power, cross-talk, non-linear effects, etc.) that depend on bulk optical signal properties (the aggregate of in-service wavelengths). The testing of viability of a communications channel therefore requires examination of transmission equipment parameters. Moreover, the controlled introduction of new channel signals over wavelengths may require adjustments of one or more of those parameters. In particular, settings of devices adapted to control a respective factor may need to be adjusted just prior to the introduction of the channel signal in order to avoid upsetting a transmission equilibrium. A step-by-step approach to obtaining a wavelength(s) to support a channel is therefore desired to avoid the complex and expensive calculation of the adjustment of factors. In accordance with the present invention, a wavelength is first selected according to rules abstracted from physical propagation constraints and resource availability information, and then the resource availability is confirmed prior to the calculation of the adjustment factors. The calculation of the adjustment factors also serves as a final check on the viability of the wavelength(s).

Figure 3:
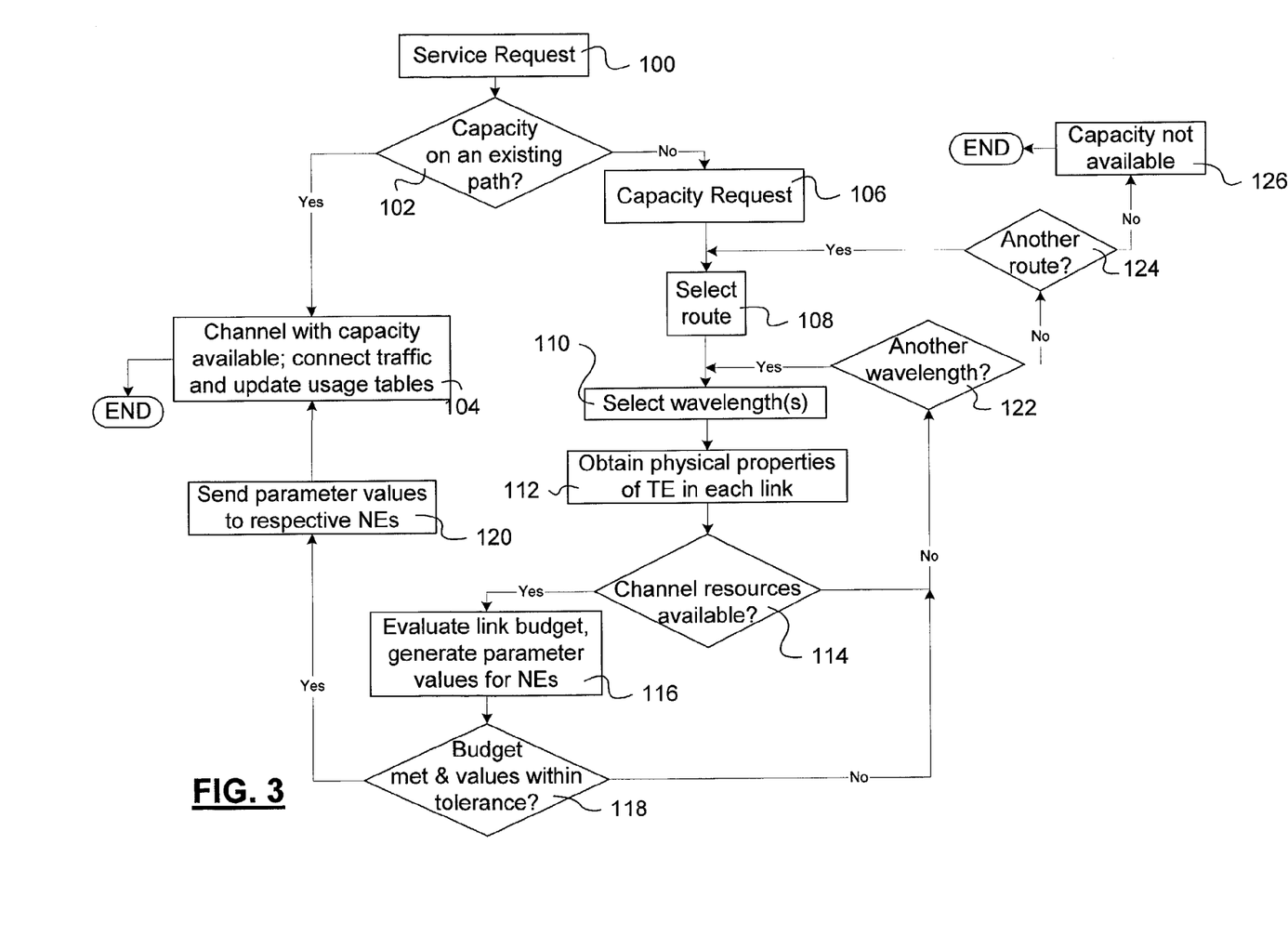
FIG. 3 is a flow chart illustrating principal steps involved in performing dynamic reconfiguration of communications channels in accordance with the present invention.

A method of determining a communications channel to satisfy a data transport service request is illustrated in FIG. 3. A service request is received by the service management module 50, in step 100. The service management module 50 stores usage information representative of, for example, an available capacity on all established channels in the agile optical network 8. The service management module is therefore able to determine whether the required capacity at a requested class of service (CoS) is available to satisfy the service request. If capacity to satisfy the request exists on an established communications channel (determined in step 102), the communications channel is selected to satisfy the request (step 104), and the usage information for the channel is updated to reflect the added traffic. If it is determined by the service management module 50 in step 102 that no established communications channel has capacity available to satisfy the request, the service management module 50 formulates a capacity request, which is sent to the WRM module 54 in step 106. If the WRM responds that capacity is not available for any reason or if there are multiple competing requests on the same path, a back-off algorithm may be used. This may incorporate a randomizer to limit recurring conflicting requests. The capacity request is received by the WRM 54, and a route is selected (step 108) from a plurality of potential routes between the network elements indicated in the capacity request. A simple rule for the viability of the route such as total distance or number of spaces may be used. Another method could be to pre-segment the network into islands of reach. The set of routes varies as routes are added or removed with updates as required in a prescribed manner. The discovery of new signaling links, and the loss of links that are out of service, yield changes to the routing tables in a manner well known in the art. Route selection algorithms based on cost, or other factors, are also well known.

After a route is selected, the WRM module 54 selects at least one wavelength to support the communications channel on the selected route (step 110). Each of the at least one wavelength(s) is restricted to the route, and, if more than one wavelength is selected, the wavelengths collectively span the route without overlap. The selection of the wavelength(s) is governed by resource availability information, and rules abstracted from network signal propagation constraints. The resource availability information is used to ensure that the resources required to support the communications channel are likely to be available, and the rules are used to predict whether a communications channel established using the selected wavelength(s) is likely to be viable.

After the wavelength(s) for the communications channel are selected by the WRM module 54, the proposed route and selected wavelength(s) are passed to the C-BRV module 55. The C-BRV module 55 retrieves relevant properties of transmission equipment in the links spanned by the wavelength(s) (step 112). The availability of the selected wavelength(s) over the route is then verified to ensure that the resources selected for the communications channel by the WRM 54 are available and in service, or may be brought into service (step 114). If the C-BRV 55 determines that the resources are available, the link budget for each wavelength(s) is calculated, and settings for the transmission equipment are determined, in order to ensure that the communications channel is viable (step 116). The calculation of the link budget preferably factors in at least one of the following constraints; signal to noise ratios, channel powers, total power, distance, number of optical spans, fibre type(s) of each span, total number of wavelengths, dispersion, fibre non-linearities, and equipment induced signal degradation.

If the link budget is met, and the values of the parameters lie within tolerances (determined in step 118), the calculated values for the parameters are sent to respective transmission equipment (step 120), and the communications channel is established (step 104). The difference between the incumbent parameter values and the calculated parameter values is the adjustment factor for the parameter measures.

If it is determined by the C-BRV module 55 in step 114 that network equipment required to support a wavelength for the communications channel is not available, or, if in step 118, one of the wavelength(s) is determined not to be viable, in step 122 it is determined whether another wavelength(s) on the same route is available. If another wavelength(s) is available, the C-BRV module 55 continues at step 110. If the resource availability information indicates that no other wavelength(s) are available, a message is passed back to the WRM module 54, which determines if there is another route to try (step 124). If there is an untried route in the routing table, the WRM module 54 returns to step 108, otherwise the WRM module reports back to service management module 50 that capacity is not available (step 126) to serve the service request. The method of selecting wavelengths and routes is further discussed below with reference to FIG. 4.

Figure 4:
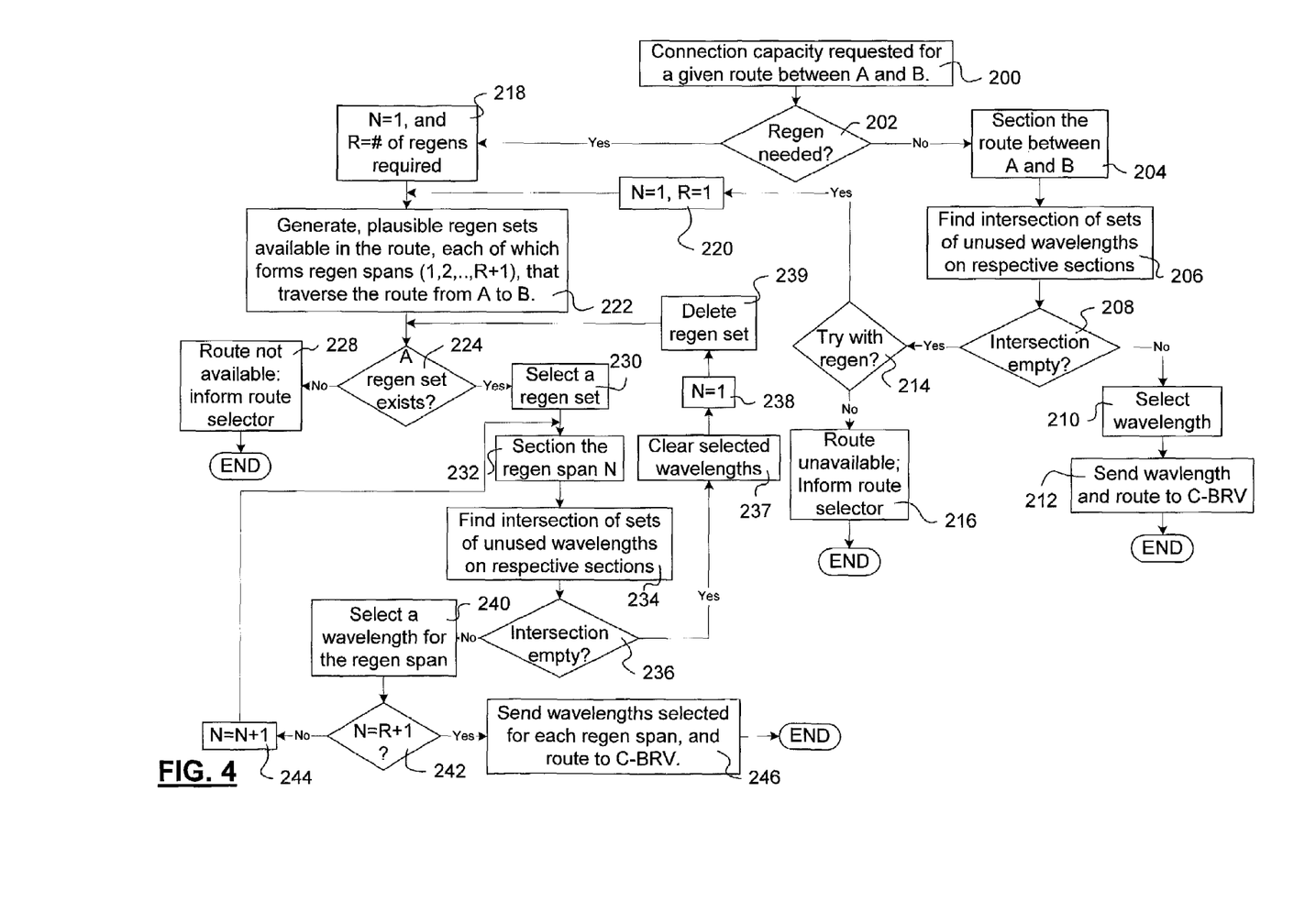
FIG. 4 is a flow chart illustrating principal steps involved in selecting at least one wavelength to establish a communications channel in accordance with an embodiment of the invention.

FIG. 4 illustrates an embodiment of a wavelength selection algorithm used by the WRM module 54 in accordance with the invention. In step 200, the WRM module 54 receives a request for capacity on a given route (between network elements A and B). The WRM module 54 computes a number, if any, of regenerations required to span the given route, using at least one rule abstracted from propagation constraints in the optical network. This rule may be a simple one based on distance, or number of spans, or a more complex calculation. If the WRM module 54 determines that no regeneration is required (in step 202), the route between A and B is sectioned into individual links (step 204). An intersection of the available wavelengths on each of the sectioned links is a set of wavelengths available between A and B. If the set is not an empty set (as determined in step 208), one of the wavelengths in the set is selected according to one or more secondary criteria, in step 210, and, in step 212, the selected wavelength and route are passed to the C-BRV 55. If the intersection is determined to be empty (step 208) the WRM 54 determines whether to attempt to select wavelengths for a communications channel that requires one regeneration (regen) (step 214). If it is determined that a selection with regeneration cannot or should not be evaluated, the WRM module 54 informs the route selection algorithm that the selected route is unavailable (step 216), and another route is selected or the service request is denied, as described above.

If in step 202, the WRM module 54 determines that regeneration is required, a variable N is set to 1, and another variable R is set to the number of regens deemed required (step 218). Similarly, if, in step 214, it is determined that the route should be tried again with one regeneration, N is set to 1, and R is set to 1 (step 220). In step 222, the route is parsed into R+1 consecutive regen spans, the parsing being dictated by a regen set, which is a set of R network elements that are adapted, and according to regeneration availability information, available to regenerate the wavelength(s) for the communications channel. All available regen sets are selected or generated. Each regen span in each regen set is numbered by an order defined by the route, preferably starting with 1.

If no regen set exists, at step 224, a message indicating that the route is not available, is sent to the route selection algorithm (step 228). If a regen set exists (as determined in step 224), one of the regen set(s) is selected (step 230). A regen span numbered N is sectioned into links, in step 232, and the intersection of wavelengths available on all of the sectioned links is determined in step 234 using wavelength availability information. If the intersection is empty (as determined in step 236), a memory containing selected wavelengths is cleared (step 237), N is reset to 1 (step 238), the regen set is deleted (step 239), and the WRM module 54 returns to step 224. Otherwise a wavelength is selected for the regen span (step 240). As is shown in the art, the wavelength selection may be randomized in order to prevent two capacity requests in the same cycle from causing recurring conflict if the capacity requests are processed in parallel. Thus the selection conforms with a back-off algorithm. If N is less than R+1 (as determined in step 242), a regen span that has not been assigned a wavelength exists. The variable N is therefore incremented by one (step 244), and the WRM module 54 returns to step 232. If N is equal to R+1, a wavelength(s) has been selected for each of the regen spans, and the route and wavelengths are sent by the WRM module 54 to the C-BRV (step 246).

After a communications channel has been selected and determined to be viable, the channel is brought into service by the WRM module 54, which also notifies the capacity manager module 52 of the new channel. The capacity manager module 52 responds by updating its resource tables and informing the service manager 50 that the communications channel has been established. The capacity manager module 52 then allocates capacity from the new channel to the service requests, and informs the service manager 50 that the service request can be admitted. The service manager 50 responds by performing the signaling required to admit the service request, and the admission process is completed.

The control system described above is not restricted to operating on a single wavelength. It may operate on a group, sub-band or band of wavelengths and treat them as a single capacity unit to be routed. The group of wavelengths may be switched together using one optical switching element, or each wavelength can go to a separate switching element.

As will be understood by those skilled in the art, the network control structure described above represents only one example of a hierarchical structure that can be implemented to reconfigure an agile optical network using constraint-based rules to minimize the computational effort required to select viable routes through the network.

The embodiment(s) of the invention described above is(are) intended to be exemplary only. The scope of the invention is therefore intended to be limited solely by the scope of the appended claims.

We claim:

1. A system for adaptively controlling communications channels in a wavelength division multiplexing (WDM) optical network that performs wavelength selective switching, the system comprising:
a wavelength and route manager (WRM) that determines a communications channel to be set up to satisfy a request for service between two network elements (A and B), the wavelength and route manager using:
a channel selection algorithm that uses at least one rule abstracted from a physical constraint on signal transmission through the optical network to select at least one wavelength for providing the communications channel between A and B, the channel selection algorithm comprising; a route selector adapted to select a route between A and B from a set of routes in accordance with at least one selection criterion, and a wavelength selector adapted to select the at least one wavelength for the communications channel on the selected route; the wavelength selector subject to the following constraints: each of the at least one wavelengths is not indicated to be currently used on any section in the route; if regeneration is required, a regenerator is available to regenerate the at least one wavelength in response to regeneration opportunity information; and the wavelength selector is further adapted further adapted to obtain a distance traversed between A and B over the selected route, and to compare the distance with a predefined regeneration threshold in order to estimate a number (R) of regenerations required for a channel on the route, R being used to select R available regeneration points on the route;

a constraint-based route validator for verifying that the at least one wavelength is viable by calculating a link budget and determining settings for transmission equipment that supports the communications channel between A and B; and means for effecting the setup of the at least one wavelength between A and B to provide the communications channel if the constraint-based route validator determines that the route is valid.

2. A system as claimed in claim 1 further comprising a service manager adapted to receive the requests for service, and exchange admission control signaling messages with edge network elements.

3. A system as claimed in claim 2 further comprising a capacity manager adapted to:

receive a request for connection capacity between specified network elements;

determine if there is available capacity to satisfy the request on an existing communications channel between the specified network elements;

if there is available capacity on an existing communications channel, allocate the capacity to the service request, and return a message to the service manager identifying the existing communications channel; and if a communications channel with available capacity does not exist to send a message to the WRM requesting that a channel be set up to satisfy the service request.

4. A system as claimed in claim 1 wherein the route selector further comprises a route evaluation algorithm adapted to:

determine a value associated with at least one of a number of optical links in the route; a sum of lengths of the optical links in the route; and, a sum of costs associated with each optical link in the route, for each route evaluated; and use the determined value of each route to select a route with a preferred value.

5. A system as claimed in claim 1 wherein the wavelength selector is further adapted to access a data store in order to retrieve at least one of wavelength utilization information, and regeneration opportunity information.

6. A system as claimed in claim 1 wherein the wavelength selector is further adapted to:

generate sets of R regeneration points;

evaluate the respective sets of R regeneration points in accordance with at least one criteria; and select a set of regeneration points that achieves a highest evaluation among the sets evaluated.

7. A system as claimed in claim 1 wherein the constraint-based route validator receives an identifier of the at least one wavelength selected by the WRM, and is adapted to:

parse the at least one wavelength into respective sections;
obtain parameters of transmission equipment in each of the sections; and communicate the settings to the transmission equipment that supports the communications channel between A and B.

8. A system as claimed in claim 7 wherein the sections are defined by a route selected by the WRM.

9. A system as claimed in claim 7 wherein the constraint-based route validator is further adapted to interface with a photonic control plane adapted to:

store values of stable properties of transmission equipment and sections in the network; and request transmission equipment status information directly from the transmission equipment.

10. A system as claimed in claim 7 wherein the constraint-based routing validator further determines equipment availability to ensure that the at least one wavelength is available, and that the transmission equipment in the route is operating within established parameters; and, evaluates signal transmission viability across each of the at least one wavelength by calculating the link budget and determining the settings for the transmission equipment.

11. A system as claimed in claim 10 wherein to evaluation of signal transmission viability determines the parameter values for transmission equipment that are used to provide coarse grain settings for the transmission equipment and the constraint-based routing validator is further adapted to send respective messages to the transmission equipment directing the transmission equipment to set transmission parameters for the channel.

12. A system as claimed in claim 11 wherein the evaluation involves sending a low-power test signal through the channel.

13. A system as claimed in claim 11 wherein the evaluation involves generating a mathematical simulation of a signal transmitted through the channel, taking into account the transmission equipment in each of the sections that the channel traverses.

14. A system as claimed in claim 10 wherein the constraint-based routing validator is further adapted to return a message to the WRM indicating that the channel is viable.

15. A method for adaptive wavelength rerouting in a wavelength division multiplexed WDM optical network that performs wavelength selective switching, in response to a request for transmission capacity between two network elements (A and B), comprising steps of:

generating a communications channel using at least one rule abstracted from physical constraints on optical signal propagation through the optical network by selecting a route from a predefined set of routes between A and B; selecting at least one wavelength that is unused by sections in the selected route according to wavelength utilization information; estimating a number (R) of regeneration points required for the channel; accessing regeneration opportunity information, to derive a set of regeneration points each of which currently have capacity to regenerate the channel on the selected route; and selecting from among the set of regeneration points a set of R regeneration points that are sufficiently spread out so that distances between successive regeneration points in the route are less than a predefined wavelength span; and verifying properties of transmission equipment for supporting the communications channel to ensure a viability of the communications channel by calculating a link budget and determining settings for the transmission equipment for supporting the communications channel.

16. A method as claimed in claim 15 wherein the step of selecting a route comprises a step of evaluating each of the routes in the predefined set using at least one predefined criterion, and selecting the route that achieves a highest evaluation.

17. A method as claimed in claim 16 wherein the step of evaluating each of the routes further comprises steps of:
   determining a value for at least one of a number of sections in the route, a sum of amplifiers in links in the route, a sum of lengths of the sections in the route, and, a sum of cost values associated with each section in the route; and
   comparing the determined values of the routes to select a route that receives an optimal value.

18. A method as claimed in claim 17 wherein the step of generating further comprises a step of accounting for at least one of the following considerations: reliability of the route; existence of protection fiber along the route; and a cost of leasing the optical fiber links in the route.

19. A method as claimed in claim 15 wherein the step of selecting from among the set further comprises steps of:
   generating a plurality of sets of R regeneration points;
   evaluating each of the plurality of sets of R regeneration points according to a predetermined criterion; and
   selecting the R regeneration points that achieved a highest evaluation among the sets of R regeneration points evaluated.

20. A method as claimed in claim 19 wherein the step of selecting the at least one wavelength further comprises a step of selecting a respective wavelength from a set of available wavelengths in each link between successive pairs of: A, B, and members of the selected set of R regeneration points.

21. A method as claimed in claim 15 wherein the step of verifying the communications channel, which comprises at least one wavelength, comprises steps of, for each of the at least one wavelength:
   parsing the wavelength into links over which it is conveyed;
   retrieving parameters of transmission equipment in each of the links that the wavelength is parsed into; and
   determining if the transmission over the wavelength is viable by calculating the link budget and determining the settings for the transmission equipment.

22. A method as claimed in claim 21 wherein the step of retrieving parameters comprises any one or more of;
   querying a data repository containing fixed data regarding transmission equipment;
   querying a data registry to determine a most recent entry of a polled property of the transmission equipment; and
   directly accessing the transmission equipment to request a status update.

23. A method as claimed in claim 22 wherein the step of determining comprises steps of:
   ensuring that the at least one wavelength is not currently used on a link over which it is supposed to span;
   ensuring that the links in the wavelengths are operating within established parameters; and
   evaluating signal transmission viability across each of the at least one wavelength.

24. A method as claimed in claim 23 wherein the step of evaluating further comprises steps of:
   generating parameter values for transmission equipment on respective links to serve as coarse grain settings of the respective transmission equipment; and
   sending the parameter values to respective transmission equipment.

25. A method as claimed in claim 24 further comprising the step of effecting the reconfiguration of the optical transmission components to establish the communications channel.

26. A system for adaptively controlling communications channels in an agile optical network, the system comprising:
   a wavelength and route manager (WRM) that determines a channel to be setup to satisfy a request for service between two network elements (A and B), using a route selection algorithm and at least one generic rule to evaluate a given set of routes between A and B, in order to identify a route;
   a route-based channel selection algorithm adapted to select at least one available channel subject to a constraint that at at least one wavelength traces the selected channel the channel selection algorithm comprising; a route selector adapted to select a route between A and B from a set of routes in accordance with at least one selection criterion, and a wavelength selector adapted to select the at least one wavelength for the communications channel on the selected route;
   the wavelength selector subject to the following constraints: each of the at least one wavelengths is not indicated to be currently used on any section in the route; if regeneration is required, a regenerator is available to regenerate the at least one wavelength in response to regeneration opportunity information; the wavelength selector further adapted to obtain a distance traversed between A and B over the selected route, and to compare the distance with a predefined regeneration threshold in order to estimate a number (R) of regenerations required for a channel on the route, R being used to select R available regeneration points on the route; and
   a constraint-based route validator that verifies a viability of the at least one wavelength by calculating a link budget and determining settings for the transmission equipment for supporting the communications channel, and effects the set up of the communications channel between A and B, if the viability is verified.

* * * * *

UNITED STATES PATENT AND TRADEMARK OFFICE
CERTIFICATE OF CORRECTION

PATENT NO. : 6,996,342 B2  Page 1 of 1
APPLICATION NO. : 09/974907
DATED : February 7, 2006
INVENTOR(S) : David W. Park et al.

It is certified that error appears in the above-identified patent and that said Letters Patent is hereby corrected as shown below:

In Column 11, lines 7-8, "wavelength selector is further adapted further adapted to obtain" is corrected to read --wavelength selector is further adapted to obtain--.

In Column 12, line 21, "wherein to evaluation" is corrected to read --wherein the evaluation--.

In Column 12, line 24, "transmission equipment and the" is corrected to read --transmission equipment, and the--.

In Column 14, line 27, "that at at least one" is corrected to read --that at least one--.

Signed and Sealed this

First Day of August, 2006

JON W. DUDAS
*Director of the United States Patent and Trademark Office*